(12) United States Patent　　　(10) Patent No.: US 11,509,025 B2
Wakimoto　　　(45) Date of Patent: Nov. 22, 2022

(54) SECONDARY BATTERY AND METHOD OF MANUFACTURING THE SAME

(71) Applicant: SANYO Electric Co., Ltd., Daito (JP)

(72) Inventor: Ryoichi Wakimoto, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 23 days.

(21) Appl. No.: 17/243,864

(22) Filed: Apr. 29, 2021

(65) Prior Publication Data

US 2021/0249742 A1　　Aug. 12, 2021

Related U.S. Application Data

(63) Continuation of application No. 16/247,963, filed on Jan. 15, 2019, now Pat. No. 11,024,925.

(30) Foreign Application Priority Data

Jan. 17, 2018　(JP) .............................. JP2018-005266

(51) Int. Cl.
　　*H01M 50/528*　　(2021.01)
　　*H01M 4/70*　　(2006.01)
　　(Continued)

(52) U.S. Cl.
　　CPC ........... *H01M 50/531* (2021.01); *H01M 4/70* (2013.01); *H01M 10/058* (2013.01);
　　(Continued)

(58) Field of Classification Search
　　None
　　See application file for complete search history.

(56) References Cited

U.S. PATENT DOCUMENTS

2010/0266894 A1　10/2010　Byun et al.
2010/0316897 A1*　12/2010　Kozuki ................... H01M 4/70
　　　　　　　　　　　　　　　　　　　　　　　　429/94

(Continued)

FOREIGN PATENT DOCUMENTS

CN　　106654337 A　　5/2017
JP　　2005-142026 A　　6/2005
(Continued)

OTHER PUBLICATIONS

English Translation of Office Action dated Apr. 13, 2022, issued in counterpart CN Application No. 201811629599.X. (4 pages).

*Primary Examiner* — Christopher P Domone
(74) *Attorney, Agent, or Firm* — WHDA, LLP

(57) ABSTRACT

A negative-electrode terminal that is secured to a sealing plate is connected to a first negative-electrode current collector. A negative-electrode tab that is connected to the negative-electrode sheet is connected to a second negative-electrode current collector. The first negative-electrode current collector and the second negative-electrode current collector are disposed along the sealing plate. The second negative-electrode current collector has an opening. The second negative-electrode current collector is disposed on the first negative-electrode current collector such that the opening faces the first negative-electrode current collector. The second negative-electrode current collector is welded to the first negative-electrode current collector around the opening.

8 Claims, 11 Drawing Sheets

(51) Int. Cl.
  *H01M 50/543*  (2021.01)
  *H01M 10/058*  (2010.01)
  *H01M 4/02*    (2006.01)
  *H01M 50/531*  (2021.01)
  *H01M 50/172*  (2021.01)

(52) U.S. Cl.
  CPC ....... *H01M 50/172* (2021.01); *H01M 50/528* (2021.01); *H01M 50/543* (2021.01); *H01M 2004/027* (2013.01); *H01M 2220/20* (2013.01)

(56) References Cited

U.S. PATENT DOCUMENTS

| | | | |
|---|---|---|---|
| 2012/0055909 A1* | 3/2012 | Miyake | H01M 50/531 219/121.64 |
| 2017/0125848 A1 | 5/2017 | Wakimoto et al. | |
| 2019/0044121 A1 | 2/2019 | Kawate | |
| 2019/0379027 A1 | 12/2019 | Fukunaga et al. | |

FOREIGN PATENT DOCUMENTS

| | | | |
|---|---|---|---|
| JP | 2017-059506 A | 3/2017 |
| JP | 2017-084695 A | 5/2017 |
| JP | 2017-216133 A | 12/2017 |
| WO | 2018/003843 A1 | 1/2018 |

\* cited by examiner

SECONDARY BATTERY AND METHOD OF MANUFACTURING THE SAME

CROSS REFERENCE TO RELATED APPLICATIONS

This application is a continuation application of U.S. patent application Ser. No. 16/247,963 filed Jan. 15, 2019, and is based upon and claims the benefits of priority from Japanese Patent Application No. 2018-005266 filed on Jan. 17, 2018, the entire contents of which being incorporated herein by reference.

BACKGROUND OF THE INVENTION

Field of the Invention

The present invention relates to a secondary battery and a method of manufacturing the secondary battery.

Description of Related Art

Prismatic secondary batteries such as alkali secondary batteries and non-aqueous electrolyte secondary batteries are used in power sources for driving, for example, electric vehicles (EVs) and hybrid electric vehicles (HEVs or PHEVs).

Each of the prismatic secondary batteries includes a battery case formed of a prismatic exterior body in the form of a tube having an opening and a bottom and a sealing plate that seals the opening of the exterior body. In the battery case, an electrode body and an electrolyte solution are accommodated, and the electrode body is formed of a positive-electrode sheet, a negative-electrode sheet, and a separator. A positive-electrode terminal and a negative-electrode terminal are secured to the sealing plate. The positive-electrode terminal is electrically connected to the positive-electrode sheet with a positive-electrode current collector interposed therebetween. The negative-electrode terminal is electrically connected to the negative-electrode sheet with a negative-electrode current collector interposed therebetween.

In some prismatic secondary batteries, a terminal and a tab of an electrode sheet are connected by a current collector member formed of plural components (see Japanese Published Unexamined Patent Application No. 2005-142026 (Patent Document 1)).

The current collector member that is formed of plural components facilitates manufacture of a secondary battery having an increased volume energy density unlike the case where the current collector member is a single component.

BRIEF SUMMARY OF THE INVENTION

It is an object of the present invention to provide a secondary battery in which a current collector member that electrically connects a terminal and a tab of an electrode sheet to each other is formed of a first current collector and a second current collector and the reliability of a joint between the first current collector and the second current collector is high, and a method of manufacturing the secondary battery.

A secondary battery according to an embodiment of the present invention includes an electrode body that includes a positive-electrode sheet and a negative-electrode sheet, an exterior body that has an opening and that accommodates the electrode body, a sealing plate that seals the opening, a terminal that is secured to the sealing plate, a tab that is connected to the positive-electrode sheet or the negative-electrode sheet, and a first current collector and a second current collector that electrically connect the terminal and the tab to each other. The first current collector is connected to the terminal. The second current collector is connected to the tab. The second current collector has an opening. The second current collector is disposed on the first current collector and welded to the first current collector around the opening.

With the structure of the secondary battery according to the embodiment of the present invention, the secondary battery has high reliability of a joint between the first current collector and the second current collector. In addition, the secondary battery readily has an increased volume energy density. The first current collector and the second current collector are preferably disposed along the sealing plate. The first current collector may be a first positive-electrode current collector or a first negative-electrode current collector, and the second current collector may be a second positive-electrode current collector or a second negative-electrode current collector.

A positive-electrode tab that is connected to the positive-electrode sheet and a negative-electrode tab that is connected to the negative-electrode sheet are preferably disposed on an end portion of the electrode body facing the sealing plate. A joint between the positive-electrode tab and the second positive-electrode current collector is preferably disposed nearer to the sealing plate than a portion of a positive electrode active material mixture layer that is nearest to the sealing plate in the thickness direction of the sealing plate. A joint between the negative-electrode tab and the second negative-electrode current collector is preferably disposed nearer to the sealing plate than a portion of a negative electrode active material mixture layer that is nearest to the sealing plate in the thickness direction of the sealing plate. In this case, the secondary battery has an increased volume energy density. A plurality of the positive-electrode tabs are more preferably stacked, and the positive-electrode tabs that are stacked are more preferably bent. A plurality of the negative-electrode tabs are more preferably stacked, and the negative-electrode tabs that are stacked are more preferably bent.

The tab is preferably connected to a surface of the second current collector facing the electrode body.

The second current collector preferably includes a thin portion, and the thin portion preferably has the opening. A portion of the second current collector that is located away from the opening is preferably welded to the first current collector.

An insulating member is preferably disposed between the sealing plate and the first current collector. A portion of the insulating member that faces a back surface of a portion of the first current collector that is welded to the second current collector preferably has a recessed portion.

The second current collector preferably includes a tab joint that is connected to the tab and a current-collector joint that is connected to the first current collector. A distance between the sealing plate and the tab joint in a thickness direction of the sealing plate is preferably shorter than a distance between the sealing plate and the current-collector joint.

A portion of the first current collector that faces the opening preferably has a flat surface.

The first current collector preferably includes a projection that has an asymmetric shape in a plan view in a region in which the first current collector does not face the second current collector.

The electrode body preferably includes a first tab group that includes a plurality of the tabs and a second tab group that includes a plurality of the tabs. The first tab group and the second tab group preferably bend in different directions. The first tab group and the second tab group are preferably connected to a surface of the second current collector facing the electrode body.

A method of manufacturing a secondary battery according to an embodiment of the present invention is a method of manufacturing a secondary battery including an electrode body that includes a positive-electrode sheet and a negative-electrode sheet, an exterior body that has an opening and that accommodates the electrode body, a sealing plate that seals the opening, a terminal that is secured to the sealing plate, a tab that is connected to the positive-electrode sheet or the negative-electrode sheet, and a first current collector and a second current collector that electrically connect the terminal and the tab to each other. The first current collector is connected to the terminal. The second current collector is connected to the tab. The method includes a terminal connecting step of connecting the terminal to the first current collector, a tab connecting step of connecting the tab to the second current collector, a step of disposing the second current collector that has an opening on the first current collector such that the opening faces the first current collector after the terminal connecting step and the tab connecting step, and a current collector connecting step of checking presence or absence of a gap between the first current collector and the second current collector, or the size of the gap, or both through the opening after the step of disposing the second current collector and subsequently welding the first current collector and the second current collector to each other by radiating energy rays.

With the method of manufacturing the secondary battery according to the embodiment of the present invention, the secondary battery has high reliability of the joint between the first current collector and the second current collector. In addition, the secondary battery readily has an increased volume energy density. The terminal connecting step and the tab connecting step may be performed in either order. The first current collector and the second current collector are preferably disposed along the sealing plate.

The method preferably further includes a step of disposing the first current collector on the sealing plate with an insulating member interposed therebetween before the terminal connecting step. The step of disposing the second current collector preferably includes disposing the second current collector on the sealing plate with the insulating member interposed therebetween.

The current collector connecting step preferably includes radiating the energy rays toward a position away from the opening to weld the first current collector and the second current collector to each other at the position away from the opening.

According to the present invention, a secondary battery having high reliability can be provided.

DETAILED DESCRIPTION OF THE INVENTION

The structure of a prismatic secondary battery 20 that corresponds to a secondary battery according to an embodiment will hereinafter be described. The present invention is not limited to the embodiment described below.

Figure 1:
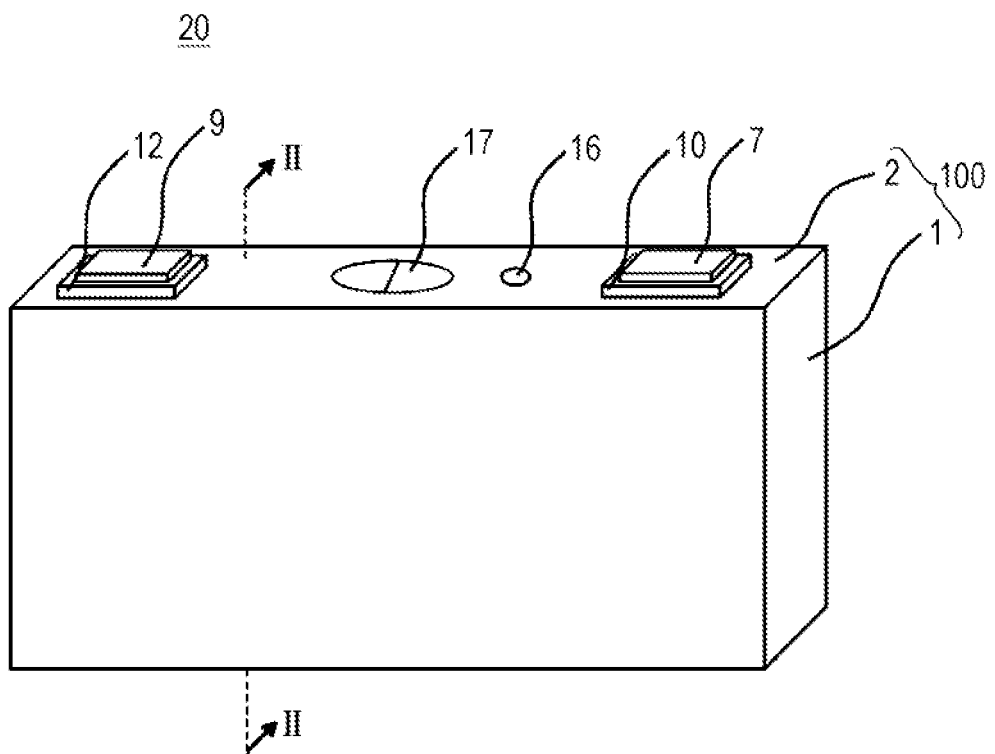
FIG. 1 is a perspective view of a secondary battery according to an embodiment.
Figure 2:
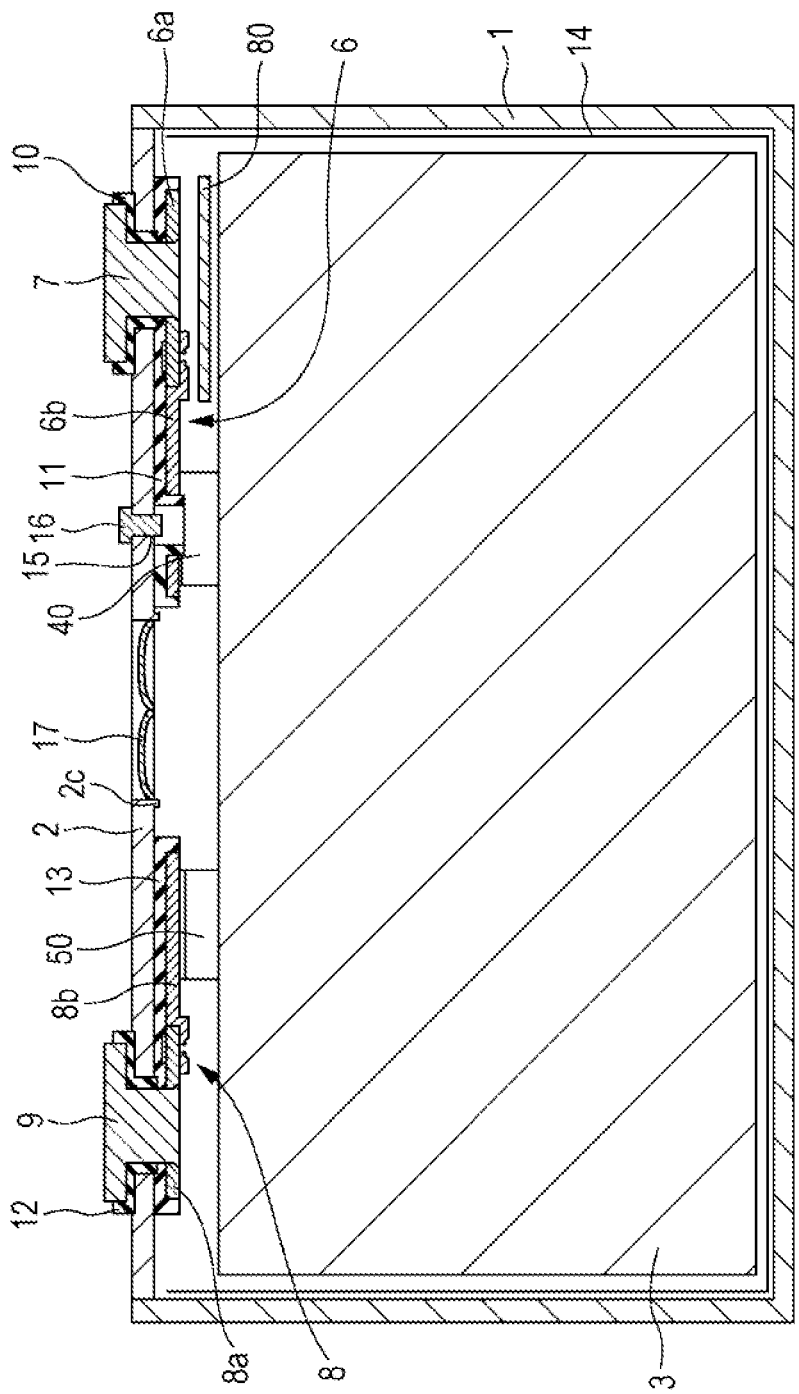
FIG. 2 is a sectional view of FIG. 1 taken along line II-II.

As illustrated in FIG. 1 and FIG. 2, the prismatic secondary battery 20 includes a battery case 100 formed of a prismatic exterior body 1 in the form of a prism having an opening and a bottom and a sealing plate 2 that seals the opening of the prismatic exterior body 1. The prismatic exterior body 1 and the sealing plate 2 are preferably composed of a metal and are preferably composed of, for example, aluminum or aluminum alloy. In the prismatic exterior body 1, an electrode body 3 and an electrolyte are accommodated, and the electrode body 3 is formed of positive-electrode sheets and negative-electrode sheets that are stacked with separators interposed therebetween.

Positive-electrode tabs 40 and negative-electrode tabs 50 are disposed on an end portion of the electrode body 3 facing the sealing plate 2. The positive-electrode tabs 40 are electrically connected to a positive-electrode terminal 7 with a second positive-electrode current collector 6b and a first positive-electrode current collector 6a interposed therebetween. The negative-electrode tabs 50 are electrically connected to a negative-electrode terminal 9 with a second negative-electrode current collector 8b and a first negative-electrode current collector 8a interposed therebetween.

The first positive-electrode current collector 6a, the second positive-electrode current collector 6b, and the positive-electrode terminal 7 are preferably composed of a metal and more preferably composed of aluminum or aluminum alloy. An outer insulating member 10 composed of a resin is disposed between the positive-electrode terminal 7 and the sealing plate 2. An inner insulating member 11 composed of a resin is disposed between the first positive-electrode current collector 6a and the and the sealing plate 2 and between the second positive-electrode current collector 6b and the sealing plate 2.

The first negative-electrode current collector 8a, the second negative-electrode current collector 8b, and the negative-electrode terminal 9 are preferably composed of a metal and more preferably composed of copper or copper alloy. The negative-electrode terminal 9 preferably includes a portion composed of aluminum or aluminum alloy and a portion composed of copper or copper alloy. In this case, the portion composed of copper or copper alloy is preferably connected to the first negative-electrode current collector 8a, and the portion composed of aluminum or aluminum alloy preferably projects toward the outside beyond the sealing plate 2. An outer insulating member 12 composed of a resin is disposed between the negative-electrode terminal 9 and the sealing plate 2. An inner insulating member 13 composed of a resin is disposed between the first negative-electrode current collector 8a and the sealing plate 2 and between the second negative-electrode current collector 8b and the sealing plate 2.

An electrode body holder 14 that is formed of a resin sheet is disposed between the electrode body 3 and the prismatic exterior body 1. The electrode body holder 14 is preferably molded by bending an insulating sheet composed of a resin into a bag shape or a box shape. The sealing plate 2 has an electrolytic solution injection hole 15. The electrolytic solution injection hole 15 is sealed by a sealing member 16. A gas exhausting valve 17 is disposed in the sealing plate 2. The gas exhausting valve 17 is broken when the pressure in the battery case 100 becomes a certain pressure or more, and gas in the battery case 100 is discharged therefrom to the outside of the battery case 100. An annular projection 2c is formed on the surface of the sealing plate 2 on the inner side of the battery around the gas exhausting valve 17.

A method of manufacturing the prismatic secondary battery 20 and the structure thereof will now be described in detail.

Positive-Electrode Sheet

Figure 3:
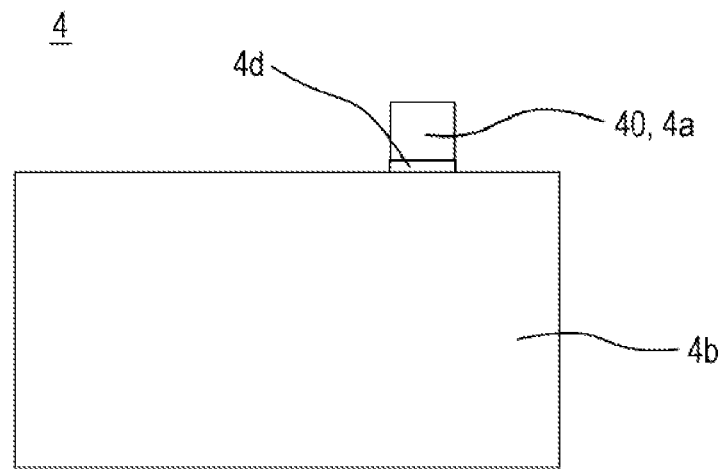
FIG. 3 is a plan view of a positive-electrode sheet according to the embodiment.

FIG. 3 is a plan view of a positive-electrode sheet 4. The positive-electrode sheet 4 includes a main body in which positive electrode active material mixture layers 4b including a positive electrode active material are formed on both surfaces of a rectangular positive-electrode core 4a. The positive-electrode core 4a projects from an end side of the main body. The positive-electrode core 4a that projects forms the positive-electrode tabs 40. The positive-electrode tabs 40 may be parts of the positive-electrode core 4a as illustrated in FIG. 3. Other members that are connected to the positive-electrode core 4a may be used as the positive-electrode tabs 40. A positive-electrode protection layer 4d having an electric resistance larger than the electric resistance of the positive electrode active material mixture layers 4b are preferably disposed on a portion of the positive-electrode tab 40 adjacent to the positive electrode active material mixture layers 4b. A metal foil such as an aluminum foil or aluminum alloy foil is preferably used as the positive-electrode core 4a. For example, a lithium transition metal composite oxide is preferably used as the positive electrode active material.

Negative-Electrode Sheet

Figure 4:
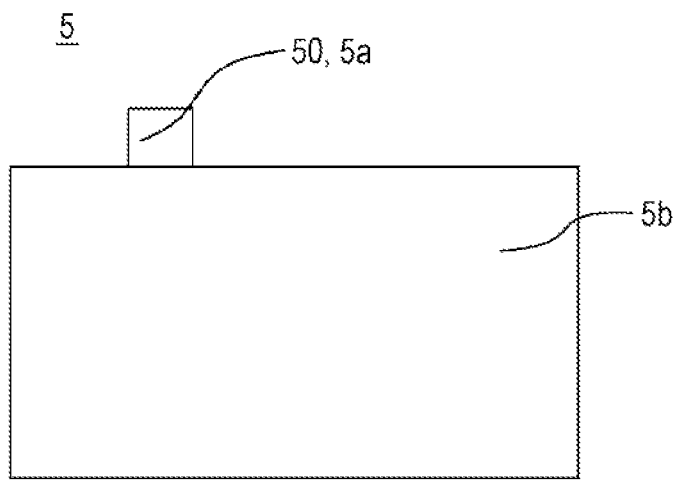
FIG. 4 is a plan view of a negative-electrode sheet according to the embodiment.

FIG. 4 is a plan view of a negative-electrode sheet 5. The negative-electrode sheet 5 includes a main body in which negative electrode active material mixture layers 5b including a negative electrode active material are formed on both surfaces of a rectangular negative-electrode core 5a. The negative-electrode core 5a projects from an end side of the main body. The negative-electrode core 5a that projects forms the negative-electrode tabs 50. The negative-electrode tabs 50 may be parts of the negative-electrode core 5a as illustrated in FIG. 4. Other members that are connected to the negative-electrode core 5a may be used as the negative-electrode tabs 50. A metal foil such as a copper foil or copper alloy foil is preferably used as the negative-electrode core 5a. For example, a carbon material or a silicon material is preferably used as the negative electrode active material.

Manufacture of Electrode Body Element

Figure 5:
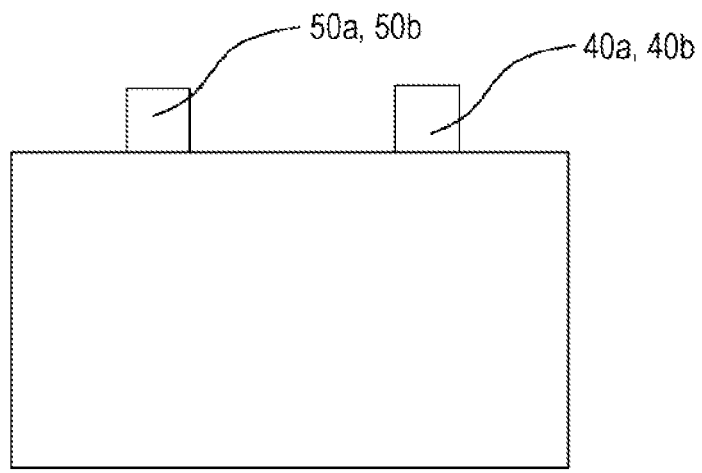
FIG. 5 is a plan view of an electrode element according to the embodiment.

The above method is used to manufacture 50 positive-electrode sheets 4 and 51 negative-electrode sheets 5. These are stacked with polyolefin rectangular separators interposed therebetween to manufacture multilayer electrode body elements (a first electrode body element 3a and a second electrode body element 3b). As illustrated in FIG. 5, the multilayer electrode body elements (the first electrode body element 3a and the second electrode body element 3b) include positive-electrode tab groups (a first positive-electrode tab group 40a and a second positive-electrode tab group 40b) and negative-electrode tab groups (a first negative-electrode tab group 50a and a second negative-electrode tab group 50b). The positive-electrode tabs 40 of the positive-electrode sheets 4 are stacked on end portions of the positive-electrode tab groups. The negative-electrode tabs 50 of the negative-electrode sheets 5 are stacked on end portions of the negative-electrode tab groups.

Some of the separators are located on both outer surfaces of each electrode body element. The electrode sheets and the separators that are stacked can be secured with, for example, a tape. Alternatively, adhesive layers may be formed on each separator, the separator and the corresponding positive-electrode sheet 4 may adhere to each other, and the separator and the corresponding negative-electrode sheet 5 may adhere to each other. The separators may be formed in a jig zag pattern to stack the positive-electrode sheets 4 and the negative-electrode sheets 5.

The size of each separator in a plan view is preferably equal to or larger than the size of each negative-electrode sheet 5. Each positive-electrode sheet 4 or each negative-electrode sheet 5 may be disposed between two separators, and the positive-electrode sheets 4 and the negative-electrode sheets 5 may be stacked after the peripheries of the separators are thermally welded to each other. A belt-like positive-electrode sheet and a belt-like negative-electrode sheet may be wound with a belt-like separator interposed therebetween to form a wound electrode body element.

Connection between Current Collector and Tab

The two electrode body elements, which are the first electrode body element 3a and the second electrode body element 3b, are manufactured in the above manner. The first electrode body element 3a and the second electrode body element 3b may have the same structure or may have different structures. The positive-electrode tabs 40 of the first electrode body element 3a form the first positive-electrode tab group 40a. The negative-electrode tabs 50 of the first electrode body element 3a form the first negative-electrode tab group 50a. The positive-electrode tabs 40 of the second electrode body element 3b form the second positive-electrode tab group 40b. The negative-electrode tabs 50 of the second electrode body element 3b form the second negative-electrode tab group 50b.

Figure 6:
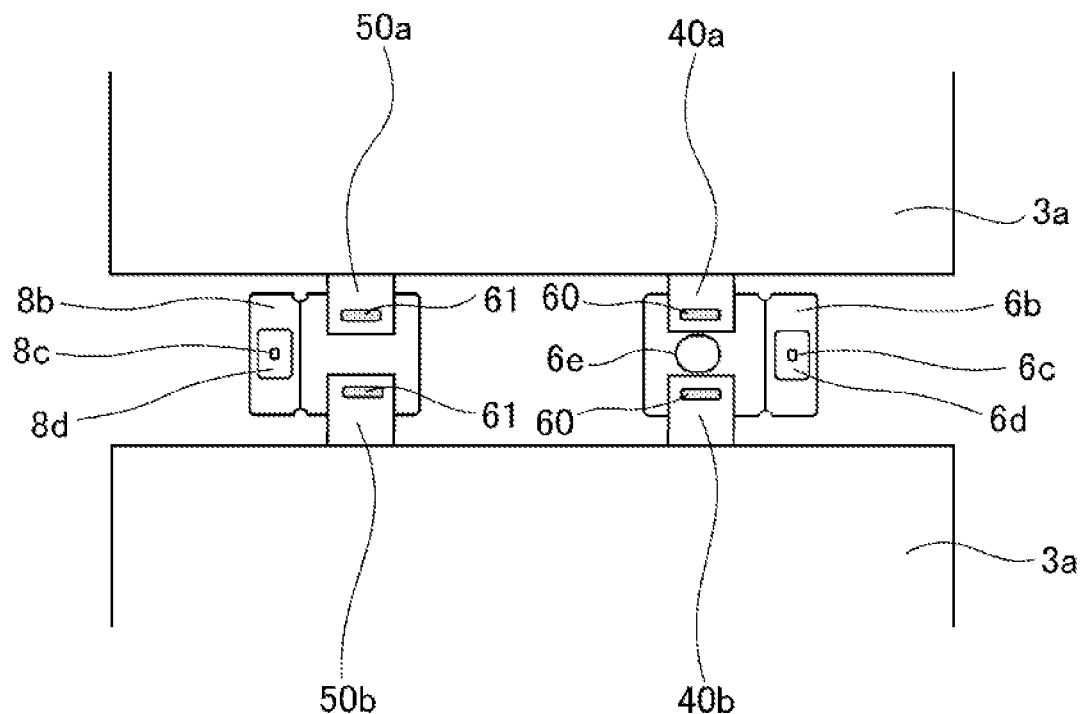
FIG. 6 illustrates positive-electrode tab groups that are connected to a positive-electrode current collector and negative-electrode tab groups that are connected to a negative-electrode current collector.

FIG. 6 illustrates the first positive-electrode tab group 40a and the second positive-electrode tab group 40b that are connected to the second positive-electrode current collector 6b and the first negative-electrode tab group 50a and the second negative-electrode tab group 50b that are connected to the second negative-electrode current collector 8b. The second positive-electrode current collector 6b and the second negative-electrode current collector 8b are disposed between the first electrode body element 3a and the second electrode body element 3b. The first positive-electrode tab group 40a and the second positive-electrode tab group 40b are disposed on the second positive-electrode current collector 6b. The first negative-electrode tab group 50a and the second negative-electrode tab group 50b are disposed on the second negative-electrode current collector 8b. The first positive-electrode tab group 40a and the second positive-electrode tab group 40b are welded to the second positive-electrode current collector 6b to form welds 60. The first negative-electrode tab group 50a and the second negative-electrode tab group 50b are welded to the second negative-electrode current collector 8b to form welds 61. A welding method is preferably ultrasonic welding or resistance welding. The laser welding can be used for connection. In the positive-electrode current collectors 6, a current collector opening 6e is formed at a position at which the positive-electrode current collector faces the electrolytic solution injection hole 15.

The second positive-electrode current collector 6b has an opening 6c. The opening 6c is formed within a thin portion 6d. The second negative-electrode current collector 8b has an opening 8c. The opening 8c is formed within a thin portion 8d.

Securing Components to Sealing Plate

The outer insulating member 10 is disposed on the sealing plate 2 on the outer surface side of the battery around a positive-electrode terminal insertion hole 2a. The inner insulating member 11 and the first positive-electrode current collector 6a are disposed on the sealing plate 2 on the inner surface side of the battery around the positive-electrode terminal insertion hole 2a. The positive-electrode terminal 7 is inserted into a through-hole of the outer insulating member 10, the positive-electrode terminal insertion hole 2a of the sealing plate 2, a through-hole of the inner insulating member 11, and a terminal connection hole of the first positive-electrode current collector 6a from the outside of the battery. An end portion of the positive-electrode terminal 7 is crimped on the first positive-electrode current collector 6a. Consequently, the positive-electrode terminal 7 and the first positive-electrode current collector 6a are secured to the sealing plate 2. A crimped portion of the positive-electrode terminal 7 and the first positive-electrode current collector 6a are preferably welded to each other.

The outer insulating member 12 is disposed on the sealing plate 2 on the outer surface side of the battery around a negative-electrode terminal insertion hole 2b. The inner insulating member 13 and the first negative-electrode current collector 8a are disposed on the sealing plate 2 on the inner surface side of the battery around the negative-electrode terminal insertion hole 2b. The negative-electrode terminal 9 is inserted into a through-hole of the outer insulating member 12, the negative-electrode terminal insertion hole 2b of the sealing plate 2, a through-hole of the inner insulating member 13, and a terminal connection hole of the first negative-electrode current collector 8a from the outside of the battery. An end portion of the negative-electrode terminal 9 is crimped on the first negative-electrode current collector 8a. Consequently, the negative-electrode terminal 9 and the first negative-electrode current collector 8a are secured to the sealing plate 2. A crimped portion of the negative-electrode terminal 9 and the first negative-electrode current collector 8a are preferably welded to each other.

Figure 7:
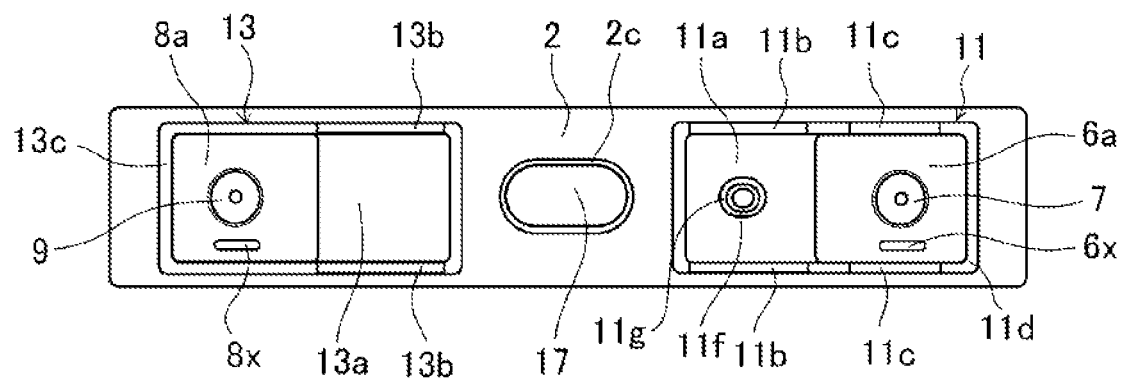
FIG. 7 illustrates a surface of a sealing plate facing an electrode body after a first positive-electrode current collector and a first negative-electrode current collector are secured.

FIG. 7 illustrates the surface of the sealing plate 2 on the inner surface side of the battery after the positive-electrode terminal 7, the outer insulating member 10, the inner insulating member 11, the first positive-electrode current collector 6a, the negative-electrode terminal 9, the outer insulating member 12, the inner insulating member 13, and the first negative-electrode current collector 8a are secured. The inner insulating member 11 on the positive electrode side includes a base 11a that is disposed along the sealing plate 2. A pair of second walls 11b that project from the base 11a toward the electrode body 3 are disposed on both ends of the base 11a in the transverse direction of the sealing plate 2. A pair of first walls 11c that project from the base 11a toward the electrode body 3 are disposed on both ends of the base 11a in the transverse direction of the sealing plate 2. An outer circumferential rib 11d is disposed along an outer circumference of the base 11a of the inner insulating member 11 at a position at which the second walls 11b and the first walls 11c are not disposed. As illustrated in FIG. 7, the first positive-electrode current collector 6a and the positive-electrode terminal 7 are connected to each other between the pair of the first walls 11c.

A current-collector projection 6x is formed on the surface of the first positive-electrode current collector 6a facing the electrode body 3. The shape of the current-collector projection 6x in a plan view is preferably a shape having the longitudinal direction and the transverse direction such as a rectangle, an ellipse, or a track shape.

The inner insulating member 13 on the negative electrode side includes a base 13a that is disposed along the sealing plate 2. A pair of third walls 13b that project from the base 13a toward the electrode body 3 are disposed on both ends of the base 13a in the transverse direction of the sealing plate 2. An outer circumferential rib 13c is disposed along an outer circumference of the base 13a of the inner insulating member 13 at a position at which the third walls 13b are not disposed.

A current-collector projection 8x is formed on the surface of the first negative-electrode current collector 8a facing the electrode body 3. The shape of the current-collector projection 8x in a plan view is preferably a shape having the longitudinal direction and the transverse direction such as a rectangle, an ellipse, or a track shape.

Connection between Terminal and Current Collector

A method of connecting the negative-electrode terminal 9 and the first negative-electrode current collector 8a to each other is taken as an example to describe a method of connecting the positive-electrode terminal 7 and the first positive-electrode current collector 6a to each other and a method of connecting the negative-electrode terminal 9 and the first negative-electrode current collector 8a to each other. The positive-electrode terminal 7 and the first positive-electrode current collector 6a can be connected to each other in the same manner as the negative-electrode terminal 9 and the first negative-electrode current collector 8a are connected to each other.

Figure 8A:
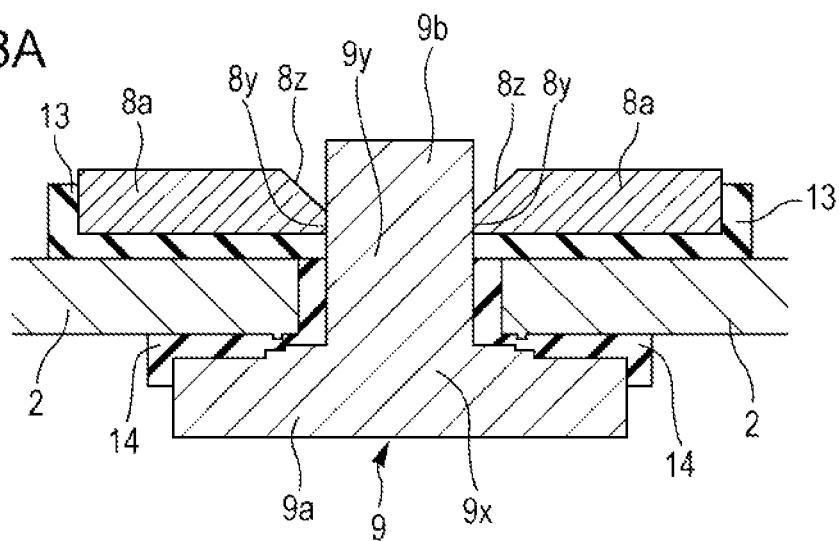
FIG. 8A is a sectional view of the vicinity of a positive-electrode terminal taken along the transverse direction of the sealing plate before the positive-electrode terminal is crimped.

As illustrated in FIG. 8A, an insertion portion 9b that is disposed on a flange 9a of the negative-electrode terminal 9 is inserted into a terminal connection hole 8y that is formed in the first negative-electrode current collector 8a. A tapered portion 8z is formed around the terminal connection hole 8y and has an inner diameter that gradually increases toward the end portion thereof farther from the sealing plate 2. The insertion portion 9b is inserted into the terminal connection hole 8y from the sealing plate 2. The negative-electrode terminal 9 preferably includes a first metal portion 9x composed of a first metal and a second metal portion 9y composed of a second metal that differs from the first metal. The first metal is preferably aluminum or aluminum alloy. The second metal is preferably copper or copper alloy. A layer composed of a third metal may be formed between the first metal portion 9x and the second metal portion 9y. The third metal is preferably nickel, or another metal.

Figure 8B:
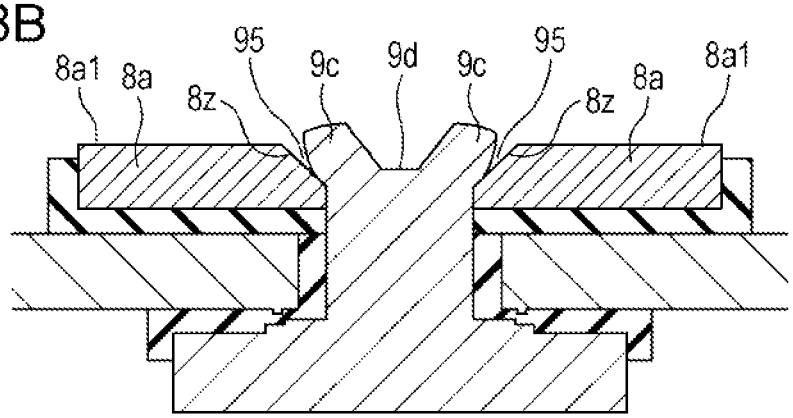
FIG. 8B is a sectional view of the vicinity of the positive-electrode terminal taken along the transverse direction of the sealing plate after the positive-electrode terminal is crimped.
Figure 8C:
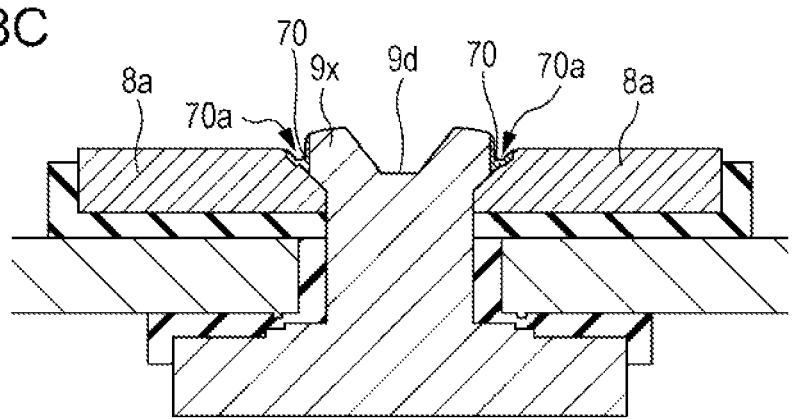
FIG. 8C is a sectional view of the vicinity of the positive-electrode terminal taken along the transverse direction of the sealing plate after the positive-electrode terminal and the first positive-electrode current collector are welded.

Subsequently, as illustrated in FIG. 8B, an end of the insertion portion 9b of the negative-electrode terminal 9 is deformed such that the diameter of the end is increased to form a crimped portion 9c. Consequently, a region of the insertion portion 9b on the end side is crimped on the first negative-electrode current collector 8a. The crimped portion 9c is crimped on the tapered portion 8z. A gap 95 is formed between the tapered portion 8z and the insertion portion 9b. The crimped portion 9c has an outer diameter larger than the minimum inner diameter thereof around the terminal connection hole 8y. A part of the crimped portion 9c projects away from the sealing plate 2 beyond a surface 8a1 of the first negative-electrode current collector 8a farther from the sealing plate 2. A recessed end portion 9d is preferably formed on an end surface of the insertion portion 9b. The recessed end portion 9d that is formed on the end surface of the insertion portion 9b enables the crimped portion 9c to be more stably formed. Energy rays such as laser rays are radiated toward the gap 95 to melt the crimped portion 9c and the tapered portion 8z of the first negative-electrode current collector 8a. The melted portions are solidified, and, as illustrated in FIG. 8C, a solidified portion 70 is formed. The negative-electrode terminal 9 and the first negative-electrode current collector 8a are joined to each other with the solidified portion 70. The metal of which the negative-electrode terminal 9 or the first negative-electrode current collector 8a that is melted is composed flows into the gap 95 and solidifies. The solidified portion 70 has a recessed portion 70a.

In the case where the negative-electrode terminal 9 and the first negative-electrode current collector 8a are connected to each other in the above manner, the negative-electrode terminal 9 and the first negative-electrode current collector 8a are more firmly connected to each other, and the prismatic secondary battery 20 has high reliability. In the case where the melted metal flows into the gap 95 between the crimped portion 9c of the negative-electrode terminal 9 and the tapered portion 8z of the first negative-electrode current collector 8a such that the solidified portion 70 that is solidified from the melted metal has the recessed portion 70a, overlap, which is a welding defect, can be inhibited from occurring. In addition, the solidified portion 70 can be effectively inhibited from having a bulge shape. Accordingly, the solidified portion 70 is unlikely to be damaged, and the reliability of the prismatic secondary battery 20 increases.

Figure 9A:
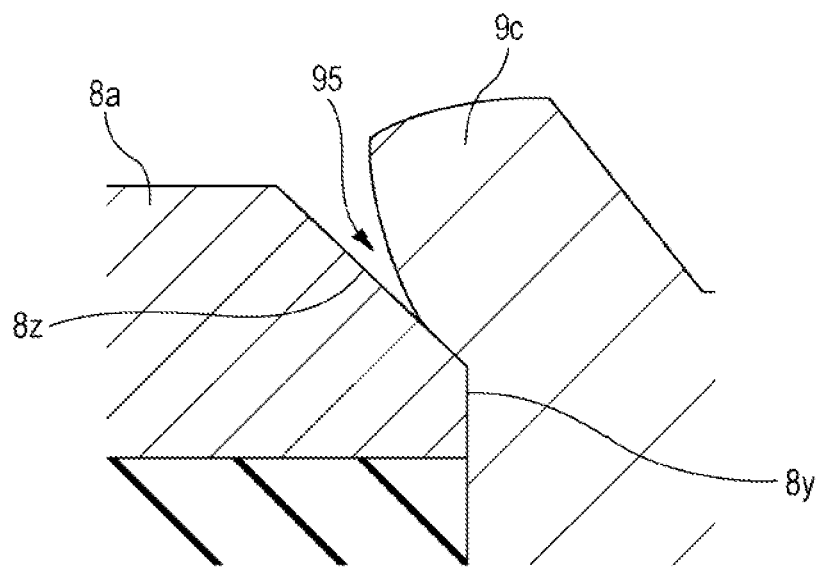
FIG. 9A is an enlarged view of the positive-electrode terminal near a crimped portion thereof in FIG. 8B.
Figure 9B:
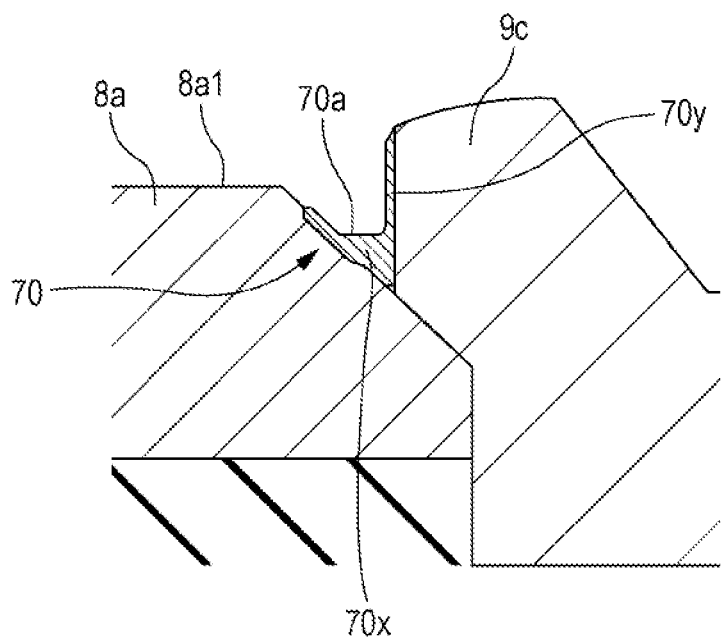
FIG. 9B is an enlarged view of the positive-electrode terminal near the crimped portion in FIG. 8C.

The bottom of the recessed portion 70a is located nearer to the sealing plate 2 (lower side in FIG. 9B) than the surface 8a1 (the upper surface of the first negative-electrode current collector 8a in FIG. 9B) of the first negative-electrode current collector 8a farther from the sealing plate 2. This makes overlap, which is a welding defect, unlikely to occur during welding. Accordingly, a part of the solidified portion 70 can be effectively prevented from chipping and falling, and a short circuit is effectively prevented from occurring. In addition, the solidified portion 70 is more unlikely to be damaged.

The negative-electrode terminal 9 is preferably crimped such that the crimped portion 9c of the negative-electrode terminal 9 projects away from the sealing plate 2 (upward in FIG. 8B) beyond the surface 8a1 of the first negative-electrode current collector 8a farther from the sealing plate 2. The amount of the melt (the volume of the melted portion) of the negative-electrode terminal 9 due to the energy rays is preferably larger than the amount of the melt (the volume of the melted portion) of the first negative-electrode current collector 8a due to the energy rays. This enables the melted metal to readily enter the gap 95, and the negative-electrode terminal 9 and the first negative-electrode current collector 8a are more firmly connected to each other.

A bottom and side walls that define the recessed portion 70a correspond to the solidified portion 70 that is solidified from the melted metal due to the energy rays. The thickness of a portion 70x of the solidified portion 70 that is located at the bottom of the recessed portion 70a in the thickness direction (vertical direction in FIG. 9B) of the first negative-electrode current collector 8a is preferably more than the thickness of a portion 70y of the solidified portion 70 that is located at one of the side walls of the recessed portion 70a in the radial direction (left-right direction in FIG. 9B) of the terminal connection hole 8y. With this structure, the negative-electrode terminal 9 and the first negative-electrode current collector 8a are connected in a more preferable state. In addition, the solidified portion 70 is more unlikely to be damaged.

It is preferable that a portion of the negative-electrode terminal 9 that is farthest from the sealing plate 2 in the thickness direction of the sealing plate 2 be not melted due to the energy rays. In this case, a manufacturing apparatus, a jig, and other components are unlikely to come into contact with the solidified portion 70.

The energy rays may be continuously radiated or may be radiated in a pulsed manner. The recessed portion 70a is preferably annular when viewed from the thickness direction (direction vertical to the sealing plate 2) of the sealing plate 2.

Connection Between First Current Collector and Second Current Collector

Figure 10:
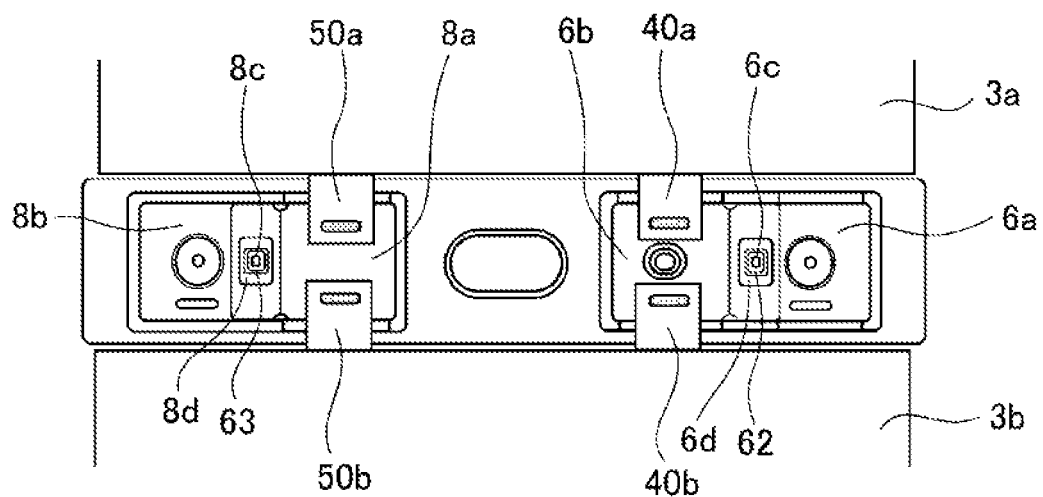
FIG. 10 illustrates the surface of the sealing plate facing the electrode body after a second positive-electrode current collector is secured to the first positive-electrode current collector and a second negative-electrode current collector is secured to the first negative-electrode current collector.

FIG. 10 illustrates the surface of the sealing plate 2 facing the electrode body 3 after the second positive-electrode current collector 6b is secured to the first positive-electrode current collector 6a and the second negative-electrode current collector 8b is secured to the first negative-electrode current collector 8a. The second positive-electrode current collector 6b that is connected to the first positive-electrode tab group 40a and the second positive-electrode tab group 40b is disposed on the base 11a of the inner insulating member 11. A part of the second positive-electrode current collector 6*b* is disposed on the first positive-electrode current collector 6*a*. The thin portion 6*d* of the second positive-electrode current collector 6*b* is welded to the first positive-electrode current collector 6*a*, and a weld 62 is formed. The weld 62 is formed so as to be away from the opening 6*c*. The weld 62 is preferably formed by energy rays such as laser rays.

The second negative-electrode current collector 8*b* that is connected to the first negative-electrode tab group 50*a* and the second negative-electrode tab group 50*b* is disposed on the base 13*a* of the inner insulating member 13. A part of the second negative-electrode current collector 8*b* is disposed on the first negative-electrode current collector 8*a*. The thin portion 8*d* of the second negative-electrode current collector 8*b* is welded to the first negative-electrode current collector 8*a*, and a weld 63 is formed. The weld 63 is formed so as to be away from the opening 8*c*. The weld 63 is preferably formed by energy rays such as laser rays.

A method of connecting the first negative-electrode current collector 8*a* and the second negative-electrode current collector 8*b* to each other is taken as an example to describe a method of connecting the first positive-electrode current collector 6*a* and the second positive-electrode current collector 6*b* to each other and a method of connecting the first negative-electrode current collector 8*a* and the second negative-electrode current collector 8*b* to each other.

Figure 11:
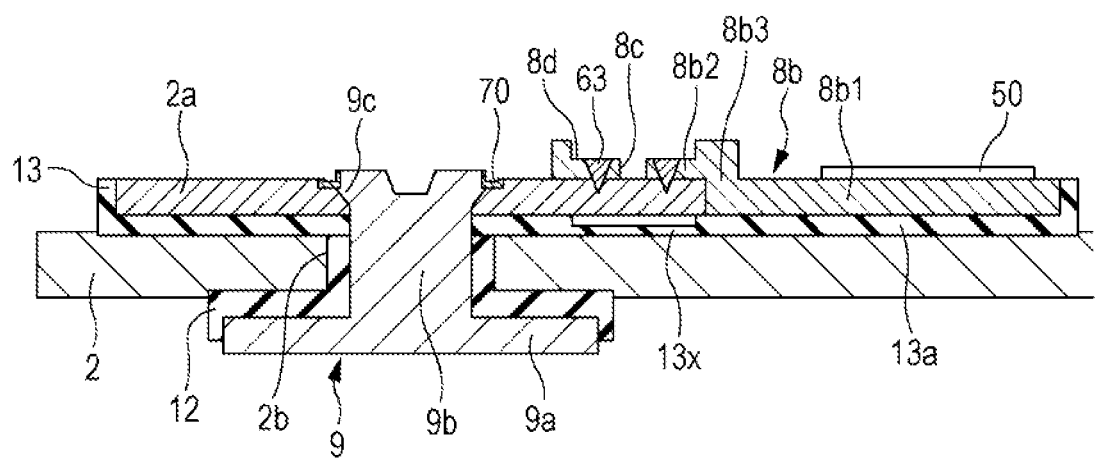
FIG. 11 is a sectional view of the vicinity of a negative-electrode terminal taken along the longitudinal direction of the sealing plate.
Figure 12:
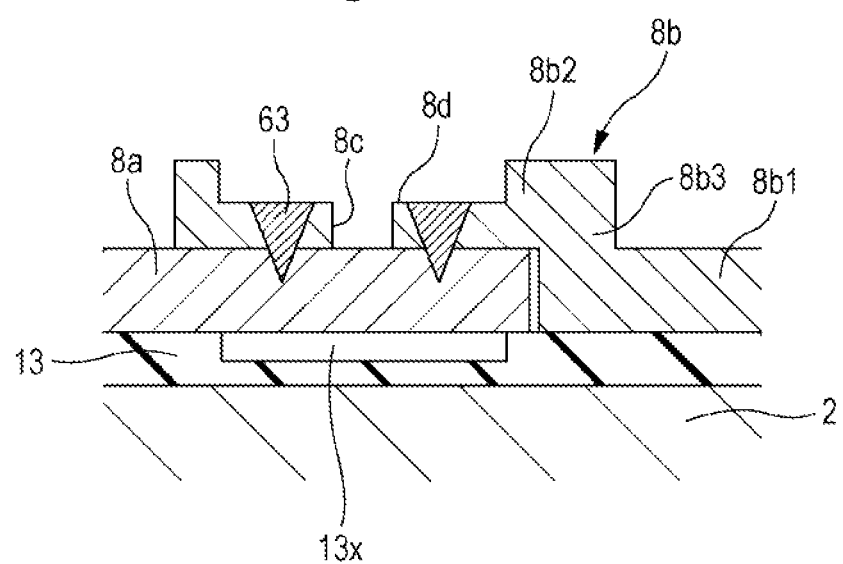
FIG. 12 is an enlarged view of the vicinity of a joint between the first negative-electrode current collector and the second negative-electrode current collector in FIG. 11.

FIG. 11 is a sectional view of the vicinity of the negative-electrode terminal 9 taken along the longitudinal direction of the sealing plate 2. The second negative-electrode current collector 8*b* includes a tab joint 8*b*1 that is connected to the negative-electrode tabs 50 (the first negative-electrode tab group 50*a* and the second negative-electrode tab group 50*b*) and a current-collector joint 8*b*2 that is connected to the first negative-electrode current collector 8*a*. A step portion 8*b*3 is disposed between the tab joint 8*b*1 and the current-collector joint 8*b*2. The tab joint 8*b*1 is disposed on the base 13*a* of the inner insulating member 13. The current-collector joint 8*b*2 is disposed on the first negative-electrode current collector 8*a*. The thin portion 8*d* of the current-collector joint 8*b*2 is welded to the first negative-electrode current collector 8*a*. When the first negative-electrode current collector 8*a* and the second negative-electrode current collector 8*b* are welded to each other, the opening 8*c* is used to check whether there is no gap between the first negative-electrode current collector 8*a* and the thin portion 8*d* of the second negative-electrode current collector 8*b*. Alternatively, the opening 8*c* is used to check whether the size of a gap between the first negative-electrode current collector 8*a* and the thin portion 8*d* of the second negative-electrode current collector 8*b* is equal to or less than a predetermined size. This enables the first negative-electrode current collector 8*a* and the second negative-electrode current collector 8*b* to be stably welded to each other. The presence or absence of the gap or the size of the gap is preferably checked by using reflection of light.

The energy rays are preferably radiated toward a position away from the opening 8*c* to form the weld 63 at the position away from the opening 8*c*. The weld 63 can be stably formed so as to be firmer than in the case where the weld 63 is formed along an edge of the opening 8*c*.

An insulating member recessed portion 13*x* is formed on the base 13*a* of the inner insulating member 13. The insulating member recessed portion 13*x* faces the back surface of the first negative-electrode current collector 8*a* opposite the surface to which the second negative-electrode current collector 8*b* is welded. This inhibits the inner insulating member 13 from being damaged due to heat that is generated when the first negative-electrode current collector 8*a* and the second negative-electrode current collector 8*b* are welded to each other.

The current-collector projection 8*x* is formed on a portion of the first negative-electrode current collector 8*a* that is not covered by the second negative-electrode current collector 8*b*. This prevents the first negative-electrode current collector 8*a* from being oriented in an incorrect direction with certainty when the first negative-electrode current collector 8*a* is connected to the negative-electrode terminal 9 and secured to the sealing plate 2. The shape of the current-collector projection 8*x* in a plan view is preferably asymmetric. The shape of the current-collector projection 8*x* in a plan view is preferably a shape having the longitudinal direction and the transverse direction. A plurality of the current-collector projections 8*x* may be formed. For example, the current-collector projections 8*x* each of which has a perfect circle shape or a square shape in a plan view may be formed. A part of the second negative-electrode current collector 8*b* is disposed on a flat surface of the first negative-electrode current collector 8*a*.

Cover

Figure 13A:
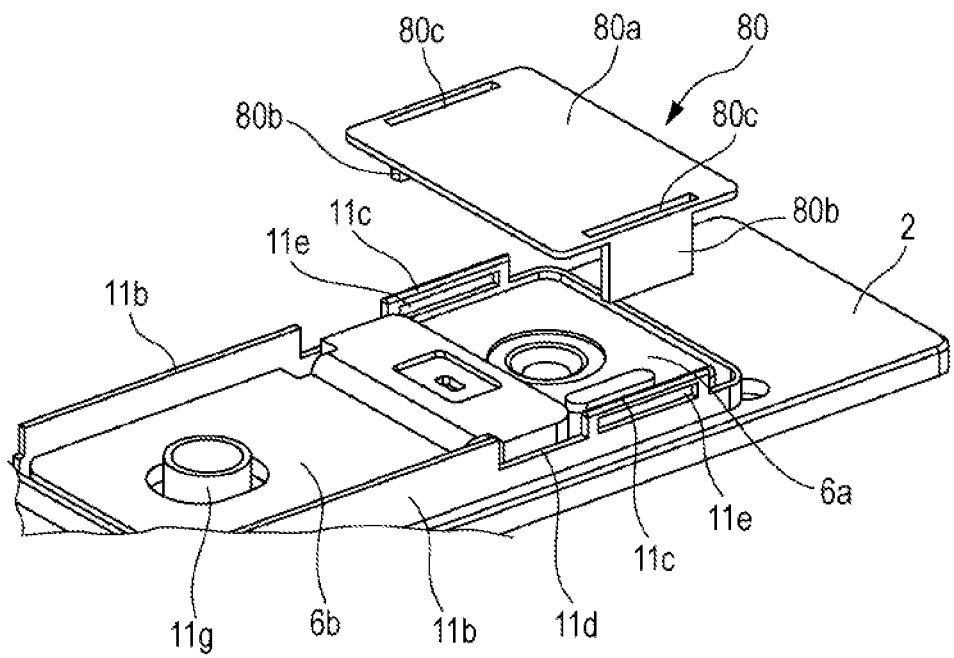
FIG. 13A and FIG. 13B illustrate perspective views of the sealing plate and a cover after components are secured.
Figure 13B:
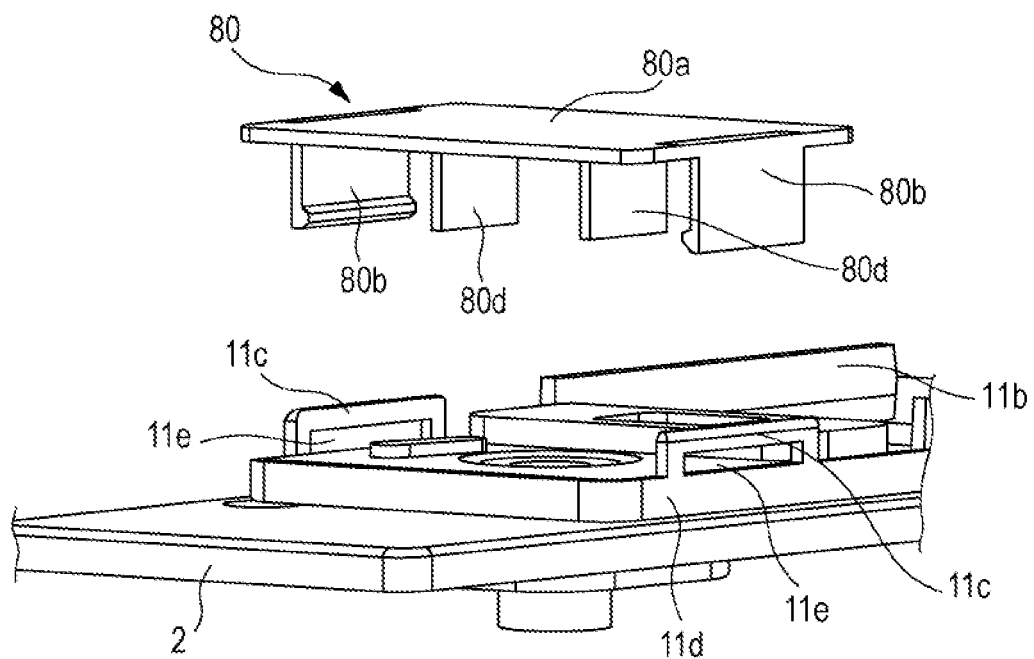
Figure 14:
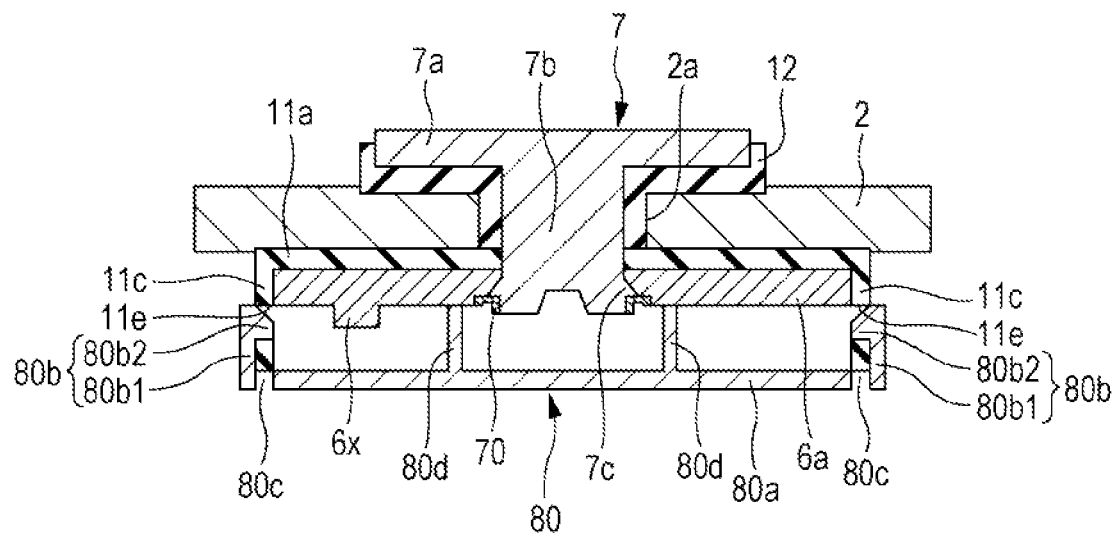
FIG. 14 is a sectional view of the vicinity of the positive-electrode terminal taken along the transverse direction of the sealing plate.

FIG. 13A and FIG. 13B illustrate perspective views of the vicinity of the positive-electrode terminal 7 after the second positive-electrode current collector 6*b* is connected to the first positive-electrode current collector 6*a*. In FIG. 13A and FIG. 13B, the first positive-electrode tab group 40*a* and the second positive-electrode tab group 40*b* that are connected to the second positive-electrode current collector 6*b* are not illustrated. FIG. 14 is a sectional view of the vicinity of the positive-electrode terminal 7 taken along the transverse direction of the sealing plate 2 with a cover 80 connected to the inner insulating member 11.

The cover 80 composed of a resin is connected to the inner insulating member 11. The cover 80 is disposed between the first positive-electrode current collector 6*a* and the electrode body 3. This prevents the electrode body 3 from coming into contact with the first positive-electrode current collector 6*a* and the sealing plate 2 although the electrode body 3 moves toward the sealing plate 2 in some cases. In the case where the cover 80 and the inner insulating member 11 are separated components, the secondary battery is more readily manufactured.

The positive-electrode tabs 40 and the positive-electrode terminal 7 can be connected by the first positive-electrode current collector 6*a* and the second positive-electrode current collector 6*b*. In this case, a portion of the cover 80 that is nearest to the electrode body 3 in the thickness direction of the sealing plate 2 is preferably located nearer to the electrode body 3 than a portion of the positive-electrode terminal 7, a portion of the first positive-electrode current collector 6*a*, and a portion of the second positive-electrode current collector 6*b* that are nearest to the electrode body 3.

The positive-electrode tabs 40 and the positive-electrode terminal 7 can be connected only by the first positive-electrode current collector without using the second positive-electrode current collector. In this case, the portion of the cover 80 that is nearest to the electrode body 3 in the thickness direction of the sealing plate 2 is preferably located nearer to the electrode body 3 than the portion of the positive-electrode terminal 7 and the portion of the first positive-electrode current collector that are nearest to the electrode body 3.

The cover 80 composed of a resin is connected to the inner insulating member 11 after the second positive-electrode current collector 6*b* is connected to the first positive-electrode current collector 6*a*. The cover 80 is preferably connected to the inner insulating member 11 after the second positive-electrode current collector 6b that is connected to the first positive-electrode tab group 40a and the second positive-electrode tab group 40b is connected to the first positive-electrode current collector 6a and before the first electrode body element 3a and the second electrode body element 3b are integrated into one piece.

The cover 80 includes a cover portion 80a that faces the first positive-electrode current collector 6a. The cover portion 80a is disposed between the first positive-electrode current collector 6a and the electrode body 3. The cover portion 80a preferably faces a joint between the first positive-electrode current collector 6a and the second positive-electrode current collector 6b. The cover 80 includes a pair of cover joints 80b that extend from the cover portion 80a toward the sealing plate 2. The cover joints 80b are connected to the inner insulating member 11. The first walls 11c of the inner insulating member 11 preferably extend toward the electrode body 3 beyond the surface of the first positive-electrode current collector 6a facing the electrode body 3. The cover joints 80b are preferably connected to portions of the first walls 11c that are located nearer to the electrode body 3 than the surface of the first positive-electrode current collector 6a facing the electrode body 3. The first walls 11c of the inner insulating member 11 can have connection openings 11e. Each cover joint 80b includes a wall 80b1 that extends from the cover portion 80a toward the sealing plate 2 and a connection projection 80b2 that is disposed on a side surface of the wall 80b1. The cover 80 can be connected to the inner insulating member 11 in a manner in which the connection projections 80b2 of the cover joints 80b are fitted into the connection openings 11e of the first walls 11c. The cover joints 80b may have connection openings, and connection projections that are disposed on the first walls 11c of the inner insulating member 11 may be fitted into the connection openings.

The first walls 11c are preferably disposed on both ends of the inner insulating member 11 in the transverse direction of the sealing plate 2. The cover joints 80b are preferably disposed on both ends of the cover 80 in the transverse direction of the sealing plate 2. The cover joints 80b and the corresponding first walls 11c are preferably connected to each other. Consequently, the inner insulating member 11 and the cover 80 are more stably connected to each other.

A gap is preferably formed between the first positive-electrode current collector 6a and the cover portion 80a in the thickness direction of the sealing plate 2. With this structure, the cover portion 80a can deform so as to bend when the electrode body 3 comes into contact with the cover portion 80a, and an impact can be alleviated. The distance between the first positive-electrode current collector 6a and the cover 80 in the thickness direction of the sealing plate 2 is preferably 1 mm or more, more preferably 3 mm or more. Root openings 80c are more preferably formed in the cover portion 80a at the roots of the cover joints 80b. This enables an impact to be more effectively alleviated.

A gap is preferably formed between the cover portion 80a and the positive-electrode terminal 7 in the thickness direction of the sealing plate 2, and it is preferable that the cover portion 80a and the positive-electrode terminal 7 be not in contact with each other. This effectively prevents a load from being applied to a joint between the positive-electrode terminal 7 and the first positive-electrode current collector 6a.

Figure 15:
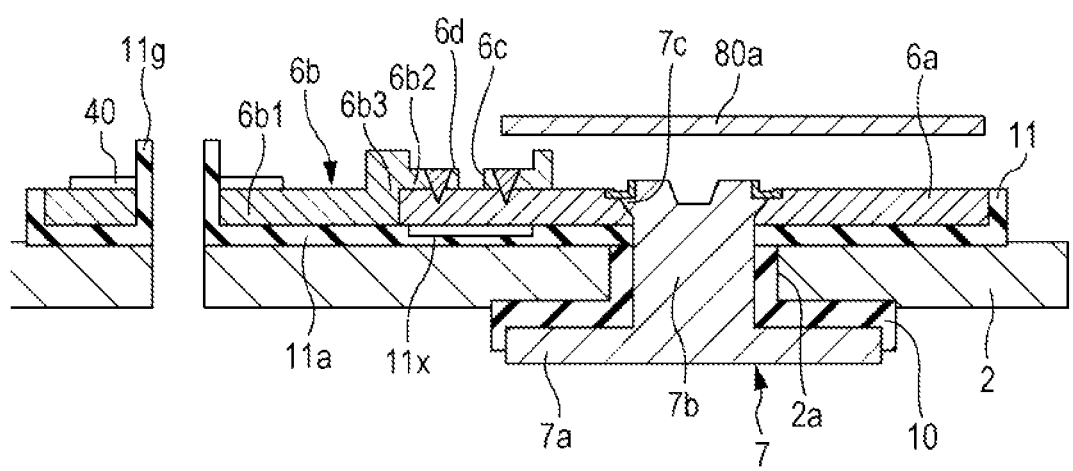
FIG. 15 is a sectional view of the vicinity of the positive-electrode terminal taken along the longitudinal direction of the sealing plate.

As illustrated in FIG. 15, the second positive-electrode current collector 6b includes a tab joint 6b1 that is connected to the positive-electrode tabs 40 and a current-collector joint 6b2 that is connected to the first positive-electrode current collector 6a. A step portion 6b3 is formed between the tab joint 6b1 and the current-collector joint 6b2. The distance between the sealing plate 2 and the current-collector joint 6b2 in the thickness direction of the sealing plate 2 is longer than the distance between the sealing plate 2 and the tab joint 6b1. The cover portion 80a is preferably located nearer to the electrode body 3 than the current-collector joint 6b2 in the thickness direction of the sealing plate 2. This enables the secondary battery to have an increased volume energy density and enables the secondary battery to be readily manufactured. The positive-electrode terminal 7 includes a flange 7a, an insertion portion 7b, and a crimped portion 7c. The inner insulating member 11 has an insulating member recessed portion 11x.

At least one support portion 80d that projects from the cover portion 80a toward the first positive-electrode current collector 6a is disposed on the cover portion 80a. The support portion 80d is preferably disposed between the pair of the cover joints 80b. A plurality of the support portions 80d may be disposed on the cover portion 80a. An end of each support portion 80d is preferably in contact with the first positive-electrode current collector 6a. Alternatively, a small gap may be formed between the end of the support portion 80d and the first positive-electrode current collector 6a. For example, the size of the gap between the end of each support portion 80d and the first positive-electrode current collector 6a (the distance between the end of the support portion 80d and the first positive-electrode current collector 6a in the thickness direction of the sealing plate 2) is preferably 3 mm or less, more preferably 1 mm or less, further preferably 0.5 mm or less. The end of each support portion 80d can come into contact with the first positive-electrode current collector 6a when the cover portion 80a bends. The support portion 80d enables the cover 80 to be inhibited from being damaged.

A wall portion that extends in the longitudinal direction of the sealing plate 2, a wall portion that extends in the transverse direction of the sealing plate 2, or a columnar portion can be disposed on the cover portion 80a and used as the support portion 80d.

The surface of the cover portion 80a facing the electrode body 3 in the thickness direction of the sealing plate 2 is preferably nearer to the electrode body 3 than the portion of the first positive-electrode current collector 6a and the portion of the second positive-electrode current collector 6b that are nearest to the electrode body 3. This causes the electrode body 3 to come into contact with the cover portion 80a first even when the electrode body 3 moves toward the sealing plate 2, and accordingly, the electrode body 3 can be inhibited from coming into contact with the first positive-electrode current collector 6a and the second positive-electrode current collector 6b.

The first positive-electrode current collector 6a preferably includes the current-collector projection 6x on the surface facing the electrode body 3. The end portion of the current-collector projection 6x facing the electrode body 3 is preferably located nearer to the electrode body 3 than the end portion of the positive-electrode terminal 7 facing the electrode body 3, and the current-collector projection 6x preferably faces the cover portion 80a. This enables a load can be effectively inhibited from being applied to the joint between the positive-electrode terminal 7 and the first positive-electrode current collector 6a even when the electrode body 3 comes into contact with the cover portion 80a.

It is only necessary for the cover 80 to be disposed near the first positive-electrode current collector 6a, or near the first negative-electrode current collector 8a, or both. The cover 80 may be disposed between the first positive-electrode current collector 6a and the electrode body 3, and the cover may not be disposed between the first negative-electrode current collector 8a and the electrode body 3.

The inner insulating member 11 has a liquid inlet 11f that faces the electrolytic solution injection hole 15 that is formed in the sealing plate 2. A tubular portion 11g that extends toward the electrode body 3 is disposed around the liquid inlet 11f. The cover portion 80a is preferably located nearer to the electrode body 3 than the end portion of the tubular portion 11g facing the electrode body 3 in the thickness direction of the sealing plate 2. This causes the electrode body 3 to come into contact with the surface of the cover portion 80a facing the electrode body 3 earlier than the tubular portion 11g when the electrode body 3 moves toward the sealing plate 2, and accordingly, a load can be inhibited from being applied locally to the electrode body 3.

Manufacture of Electrode Body

The first positive-electrode tab group 40a, the second positive-electrode tab group 40b, the first negative-electrode tab group 50a, and the second negative-electrode tab group 50b are bent such that the upper surface of the first electrode body element 3a and the upper surface of the second electrode body element 3b in FIG. 10 are in contact with each other directly or with another member interposed therebetween. Consequently, the first electrode body element 3a and the second electrode body element 3b are integrated into the electrode body 3. The first electrode body element 3a and the second electrode body element 3b are preferably integrated with a tape. Alternatively, the first electrode body element 3a and the second electrode body element 3b are preferably integrated by being disposed in the electrode body holder 14 in the form of a box or a bag.

The outer surface of the first positive-electrode tab group 40a that is bent preferably faces the inner surface of one of the pair of the second walls 11b. The outer surface of the second positive-electrode tab group 40b that is bent preferably faces the inner surface of the other of the pair of the second walls 11b. The outer surface of the first negative-electrode tab group 50a that is bent preferably faces the inner surface of one of the pair of the third walls 13b. The outer surface of the second negative-electrode tab group 50b that is bent preferably faces the inner surface of the other of the pair of the third walls 13b.

The electrode body 3 that is covered by the electrode body holder 14 that is molded out of a resin sheet into a box shape or a bag shape is inserted into the prismatic exterior body 1. The sealing plate 2 and the prismatic exterior body 1 are welded to each other. The opening of the prismatic exterior body 1 is sealed by the sealing plate 2. An electrolyte solution is poured into the prismatic exterior body 1 via the electrolytic solution injection hole 15 that is formed in the sealing plate 2. Subsequently, the electrolytic solution injection hole 15 is sealed by the sealing member such as a blind rivet.

The electrode body holder 14 and the second walls 11b preferably overlap, and the electrode body holder 14 and the third walls 13b preferably overlap when viewed from the direction perpendicular to the side walls of the prismatic exterior body 1 that has a larger area. This prevents the first positive-electrode tab group 40a, the second positive-electrode tab group 40b, the first negative-electrode tab group 50a, and the second negative-electrode tab group 50b from coming into contact with the prismatic exterior body 1 with more certainty.

In the prismatic secondary battery 20 according to the above embodiment, the positive-electrode tab groups (the first positive-electrode tab group 40a and the second positive-electrode tab group 40b) and the negative-electrode tab groups (the first negative-electrode tab group 50a and the second negative-electrode tab group 50b) are disposed on the end portion of the electrode body 3 facing the sealing plate 2. The positive-electrode tab groups are bent and connected to the surface of the second positive-electrode current collector 6b facing the electrode body 3, and the second positive-electrode current collector 6b is disposed along the sealing plate 2. The negative-electrode tab groups are bent and connected to the surface of the second negative-electrode current collector 8b facing the electrode body 3, and the second negative-electrode current collector 8b is disposed along the sealing plate 2. With this structure, the secondary battery has an increased volume energy density.

Others

According to the above embodiment described by way of example, the electrode body 3 is formed of the two electrode body elements. The present invention, however, is not limited thereto. The electrode body 3 may be formed of three or more electrode body elements. The electrode body elements are not limited to multilayer electrode bodies and may be wound electrode bodies each of which is obtained by winding a belt-like positive-electrode sheet and a belt-like negative-electrode sheet with a belt-like separator interposed therebetween. The electrode body 3 may has a single multilayer electrode body. The electrode body 3 may has a single wound electrode body obtained by winding the belt-like positive-electrode sheet and the belt-like negative-electrode sheet with the belt-like separator interposed therebetween.

The cover 80 is preferably composed of a resin. For example, the cover 80 is preferably composed of polypropylene (PP), polyethylene (PE), or polyphenylene sulfide (PPS).

Examples of the energy rays used for welding include laser rays and electron beams.

In the prismatic secondary battery 20 according to the above embodiment described by way of example, the positive-electrode current collector that electrically connects the positive-electrode terminal and the positive-electrode tabs to each other is formed of two components. However, the positive-electrode current collector may be a single component. In the prismatic secondary battery 20 according to the above embodiment described by way of example, the negative-electrode current collector that electrically connects the negative-electrode terminal and the negative-electrode tabs to each other is formed of two components. However, the negative-electrode current collector may be a single component. A current interrupt mechanism may be disposed on a conductive path between the positive-electrode terminal and the positive-electrode sheets or on the conductive path between the negative-electrode terminal and the negative-electrode sheets.

The materials of the positive-electrode sheets, the negative-electrode sheets, the separators, the electrolyte, and other components can be known materials. According to the present invention, a battery system of the secondary battery is not limited. For example, the secondary battery can be a non-aqueous electrolyte secondary battery such as a lithium-ion battery. According to the present invention, the shape of the secondary battery is not limited to a specific shape.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode body that includes a positive-electrode sheet and a negative-electrode sheet;
an exterior body that has an opening and that accommodates the electrode body;
a sealing plate that seals the opening;
a terminal that is secured to the sealing plate;
a tab that is connected to the positive-electrode sheet or the negative-electrode sheet; and
a first current collector and a second current collector that electrically connect the terminal and the tab to each other,
wherein the first current collector and the second current collector are accommodated in the exterior body,
wherein the first current collector is connected to the terminal,
wherein the second current collector is connected to the tab,
wherein the second current collector has an opening, and
wherein the second current collector is disposed on the first current collector and welded to the first current collector around the opening.

2. The secondary battery according to claim 1, wherein the tab is connected to a surface of the second current collector facing the electrode body.

3. The secondary battery according to claim 1, wherein the second current collector includes a thin portion, and the thin portion has the opening, and wherein a portion of the second current collector that is located away from the opening is welded to the first current collector.

4. The secondary battery according to claim 1, wherein an insulating member is disposed between the sealing plate and the first current collector, and
wherein a portion of the insulating member that faces a back surface of a portion of the first current collector that is welded to the second current collector has a recessed portion.

5. The secondary battery according to claim 1, wherein the second current collector includes a tab joint that is connected to the tab and a current-collector joint that is connected to the first current collector, and
wherein a distance between the sealing plate and the tab joint in a thickness direction of the sealing plate is shorter than a distance between the sealing plate and the current-collector joint.

6. The secondary battery according to claim 1, wherein a portion of the first current collector that faces the opening has a flat surface.

7. The secondary battery according to claim 1, wherein the first current collector includes a projection that has an asymmetric shape in a plan view in a region in which the first current collector does not face the second current collector.

8. The secondary battery according to claim 1, wherein the electrode body includes a first tab group that includes a plurality of the tabs and a second tab group that includes a plurality of the tabs,
wherein the first tab group and the second tab group bend in different directions, and
wherein the first tab group and the second tab group are connected to a surface of the second current collector facing the electrode body.

* * * * *